US012407108B2

(12) United States Patent
Hwang

(10) Patent No.: US 12,407,108 B2
(45) Date of Patent: Sep. 2, 2025

(54) MULTI-BAND PATCH ANTENNA

(71) Applicant: AMOTECH CO., LTD., Incheon (KR)

(72) Inventor: Chul Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 151 days.

(21) Appl. No.: 18/283,783

(22) PCT Filed: Mar. 17, 2022

(86) PCT No.: PCT/KR2022/003740
§ 371 (c)(1),
(2) Date: Sep. 22, 2023

(87) PCT Pub. No.: WO2022/203280
PCT Pub. Date: Sep. 29, 2022

(65) Prior Publication Data

US 2024/0186706 A1 Jun. 6, 2024

(30) Foreign Application Priority Data

Mar. 22, 2021 (KR) ........................ 10-2021-0036391

(51) Int. Cl.
*H01Q 9/04* (2006.01)
*H01Q 1/38* (2006.01)
(Continued)

(52) U.S. Cl.
CPC ............. *H01Q 9/0457* (2013.01); *H01Q 5/25* (2015.01)

(58) Field of Classification Search
CPC ........ H01Q 1/243; H01Q 1/48; H01Q 21/065; H01Q 1/38; H01Q 9/0414; H01Q 1/2283;
(Continued)

(56) References Cited

U.S. PATENT DOCUMENTS 6,140,968 A * 10/2000 Kawahata ................ H01Q 1/38 343/702
6,218,990 B1 * 4/2001 Grangeat ............. H01Q 9/0421 343/846
(Continued)

FOREIGN PATENT DOCUMENTS

JP 2004-221965 A 8/2004
JP 2006-067259 A 3/2006
(Continued)

OTHER PUBLICATIONS

Title: Circularly Polarized Wave Patch Antenna [JP2004221965], Author:Suzuki Atsushi Original (Year: 2004).*
(Continued)

*Primary Examiner* — Wei (Victor) Y Chan
(74) *Attorney, Agent, or Firm* — Maschoff Brennan

(57) ABSTRACT

Provided is a multi-band patch antenna which has, on a base substrate, a feeding patch and radiation patches, which are formed apart from an upper patch, so as to resonate with a first frequency band and a second frequency band. The provided multi-band patch antenna comprises: a base substrate having an upper surface, a lower surface, and a plurality of sides; an upper patch disposed on the upper surface of the base substrate; a lower patch disposed on the lower surface of the base substrate; a feeding patch disposed on the upper surface and a first side of the base substrate and disposed to be apart from the upper patch; and a first radiation patch disposed on the upper surface and a second side of the base substrate and disposed to be apart from the upper patch and the feeding patch on the upper surface of the base substrate.

10 Claims, 10 Drawing Sheets

(51) Int. Cl.
*H01Q 1/48* (2006.01)
*H01Q 5/25* (2015.01)

(58) Field of Classification Search
CPC .... H01Q 21/28; H01Q 9/0457; H01Q 9/0407; H01Q 9/045; H01Q 9/0421; H01Q 21/0025
See application file for complete search history.

(56) References Cited

U.S. PATENT DOCUMENTS

| | | | | |
|---|---|---|---|---|
| 6,496,148 B2 * | 12/2002 | Ngounou Kouam | H01Q 5/371 | 343/846 |
| 8,098,203 B2 * | 1/2012 | Ueki | H01Q 9/0421 | 343/846 |
| 10,312,567 B2 * | 6/2019 | Bennett | H01P 3/10 | |
| 2001/0015701 A1 * | 8/2001 | Ito | H01Q 19/005 | 343/843 |
| 2006/0044191 A1 * | 3/2006 | Harihara | H01Q 1/2283 | 343/700 MS |
| 2006/0049990 A1 * | 3/2006 | Watada | H01Q 1/38 | 343/702 |

FOREIGN PATENT DOCUMENTS

| | | |
|---|---|---|
| KR | 10-2011-0062282 A | 6/2011 |
| KR | 10-2014-0095129 A | 8/2014 |
| KR | 10-2015-0120194 A | 10/2015 |

OTHER PUBLICATIONS

Title: Circularly Polarized Wave Patch Antenna [JP2004221965], Author:Suzuki Atsushi Translation (Year: 2004).*
Title: KR1020140095129—Ultra-Wideband Patch Antenna, Publication: 2014 Original (Year: 2014).*
Title: KR1020140095129—Ultra-Wideband Patch Antenna, Publication: 2014 Translation (Year: 2014).*
KR First Office Action dated Apr. 4, 2023 as received in Application No. 10-2021-0036391.
KR Second Office Action dated Sep. 1, 2023 as received in Application No. 10-2021-0036391.

* cited by examiner

[FIG. 1]
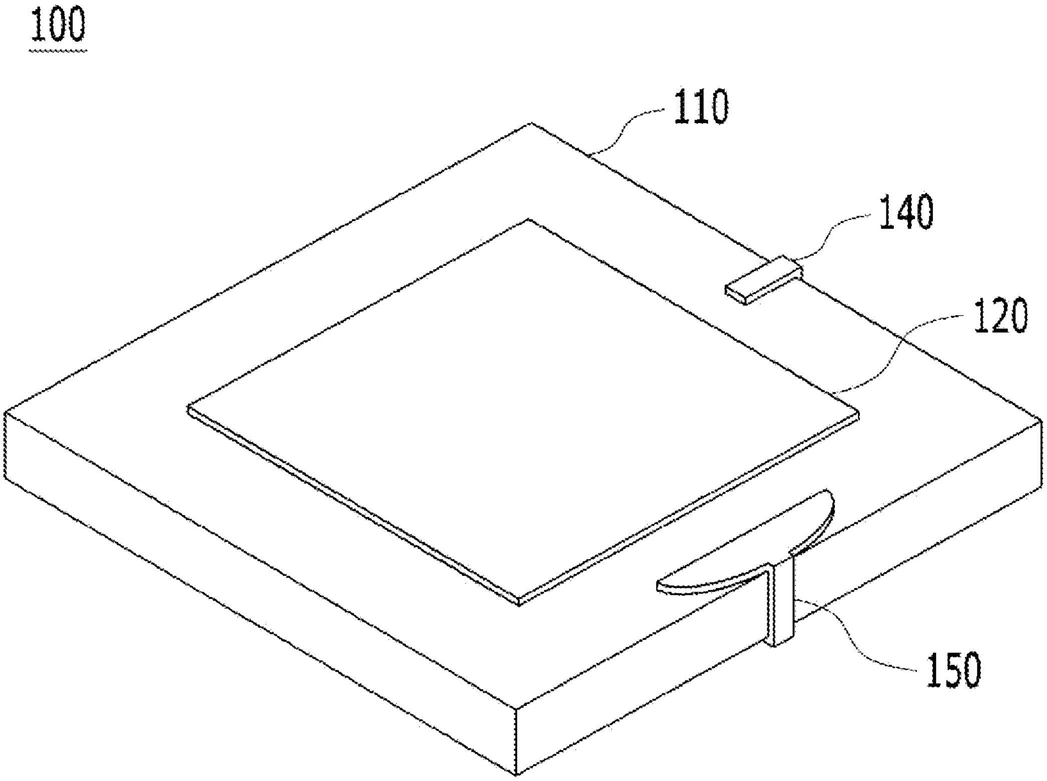

[FIG. 2]
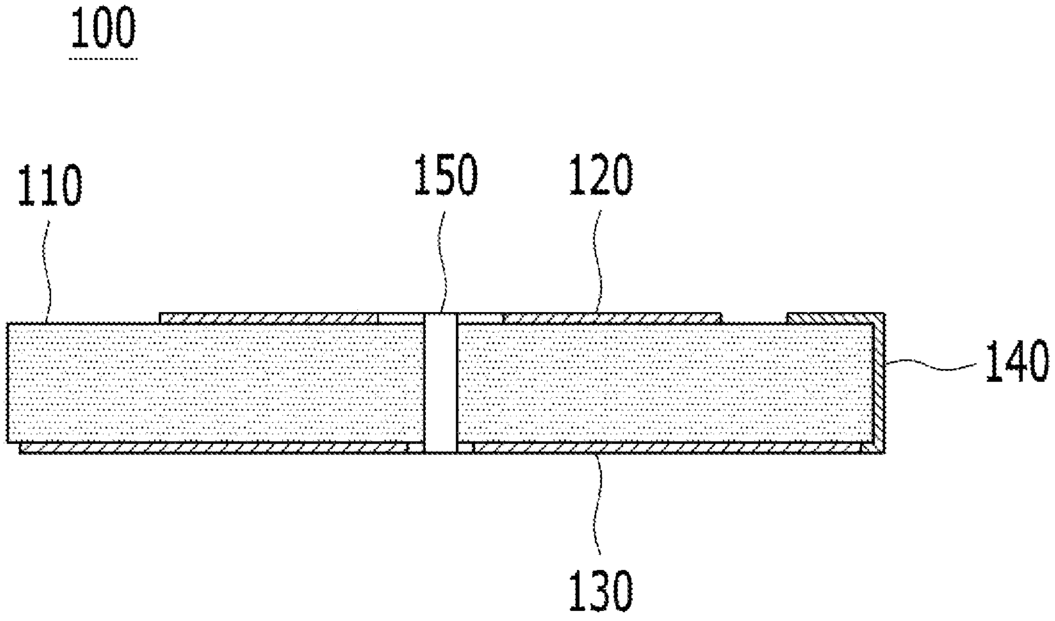

[FIG. 3]
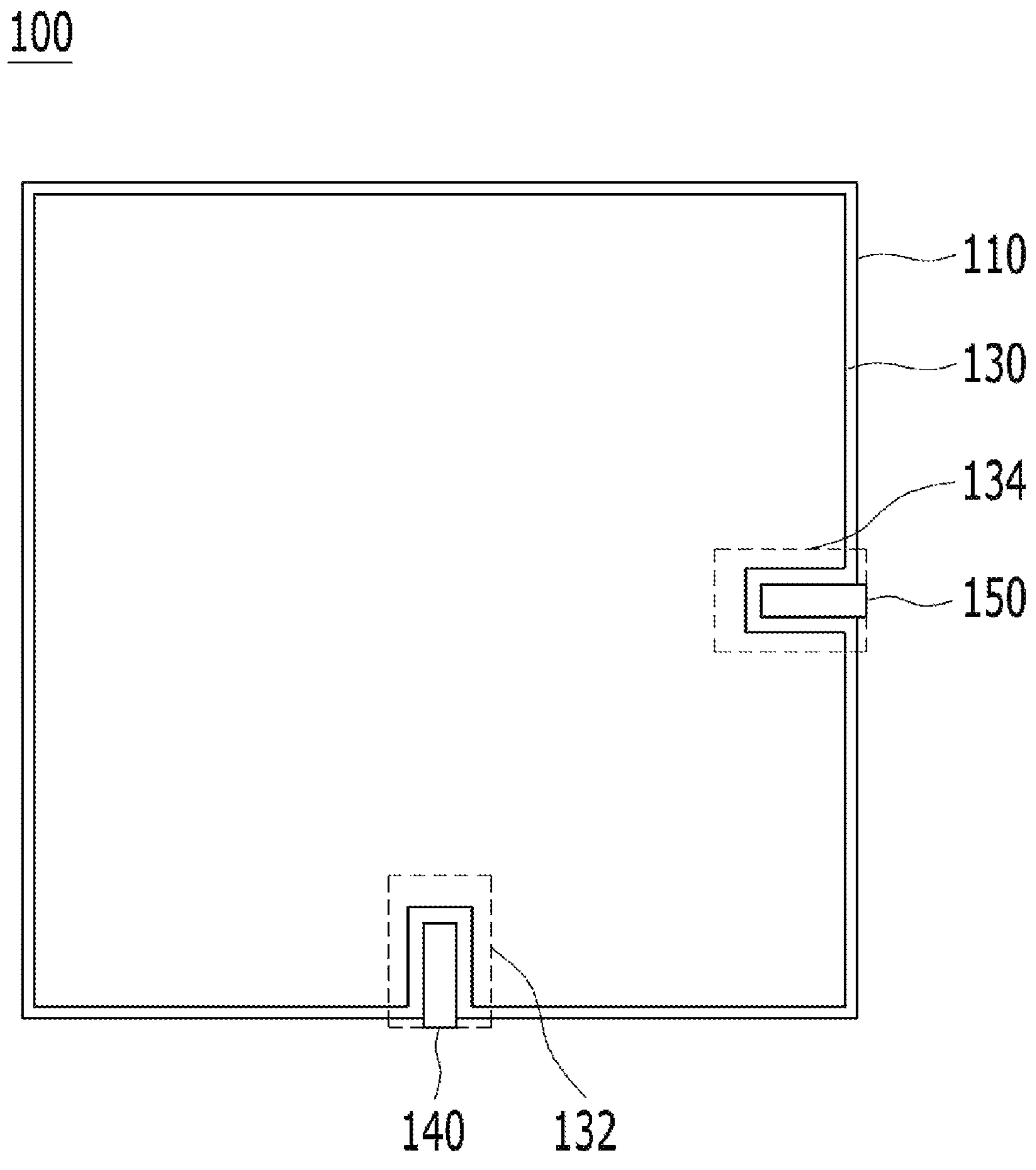

[FIG. 4]
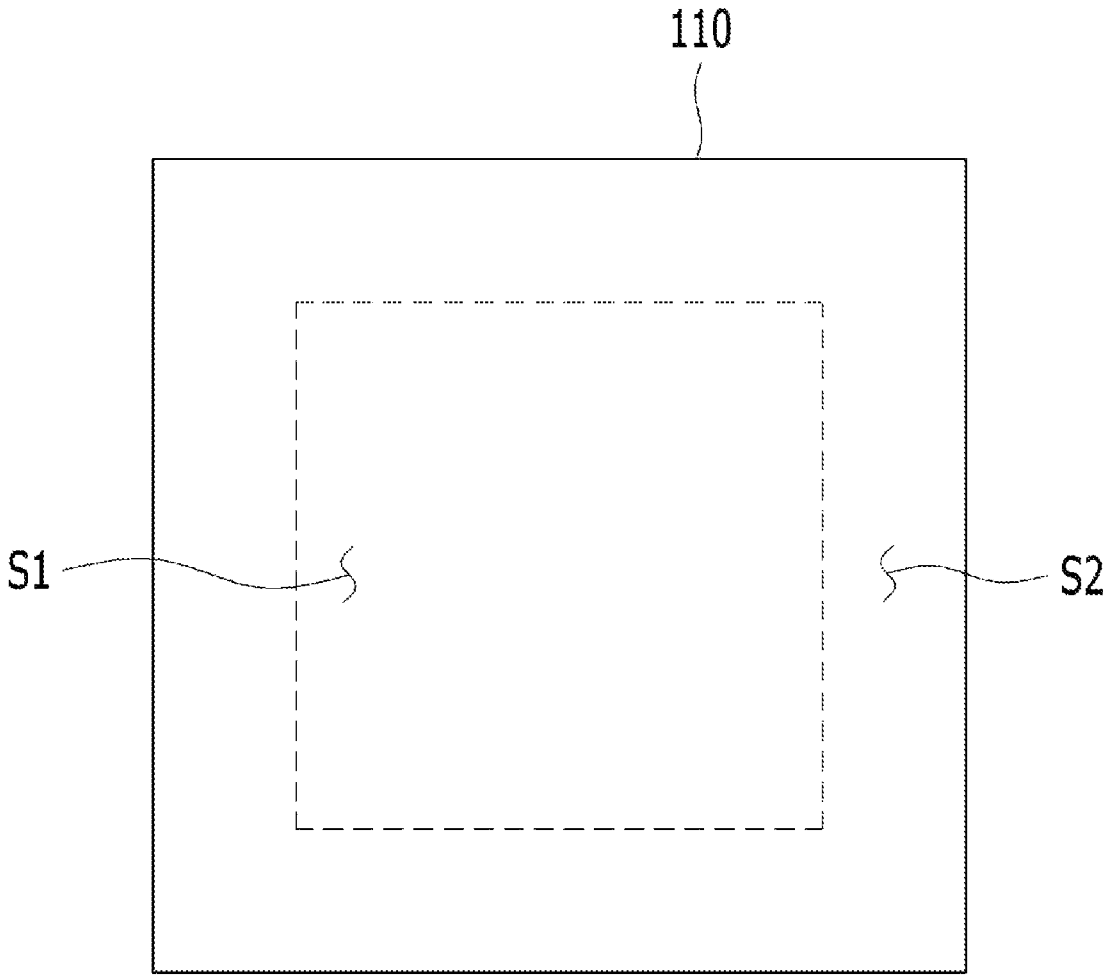

[FIG. 5]
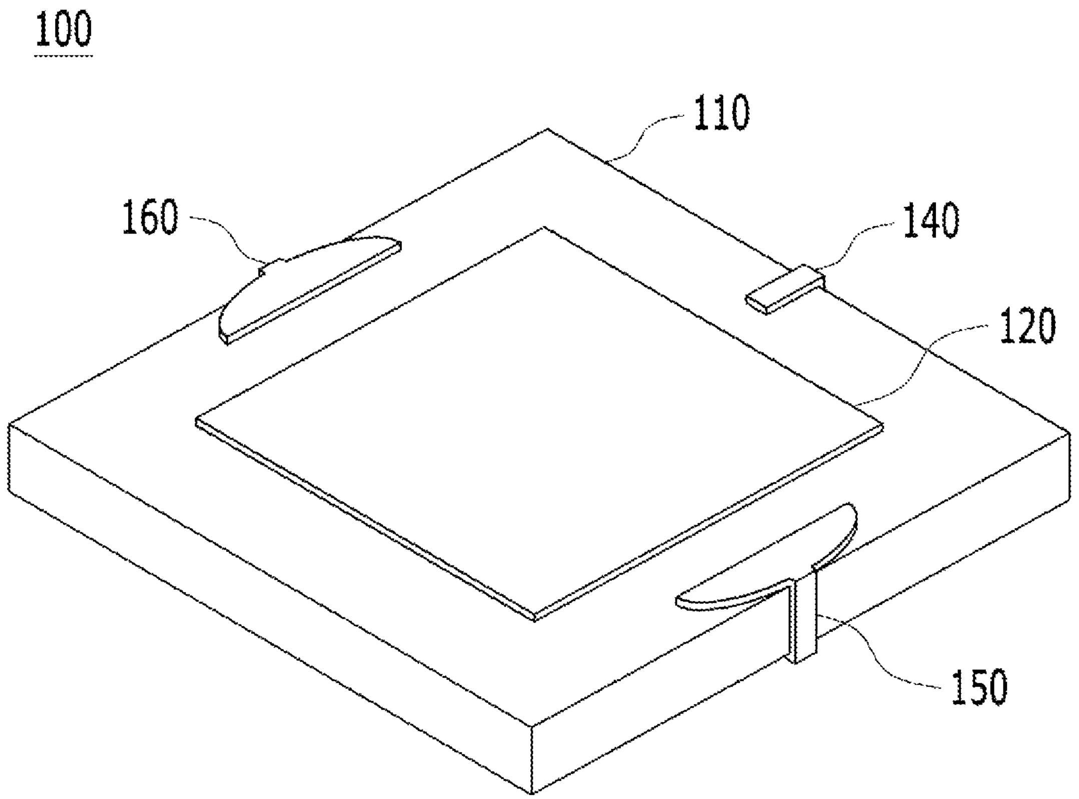

[FIG. 6]
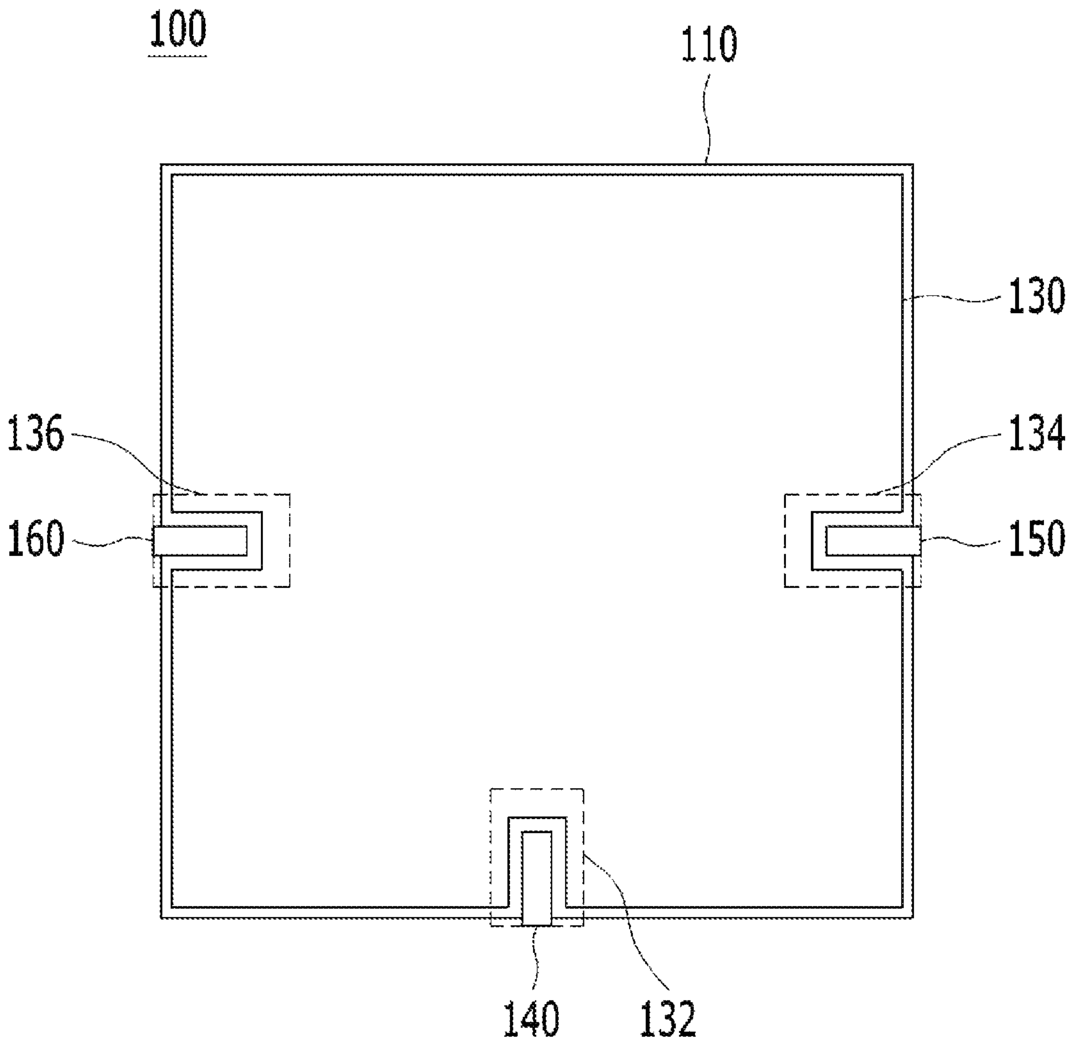

[FIG. 7]
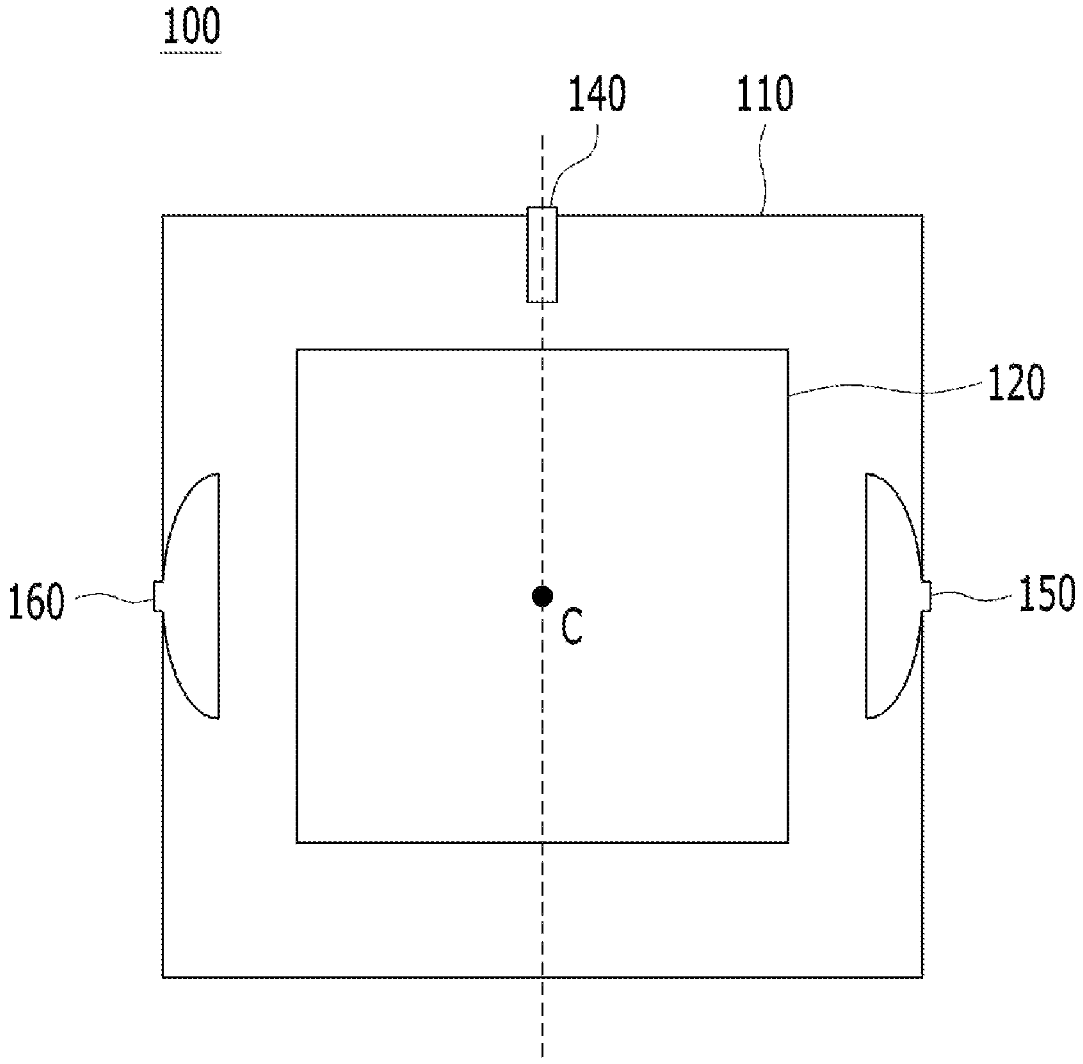

[FIG. 8]
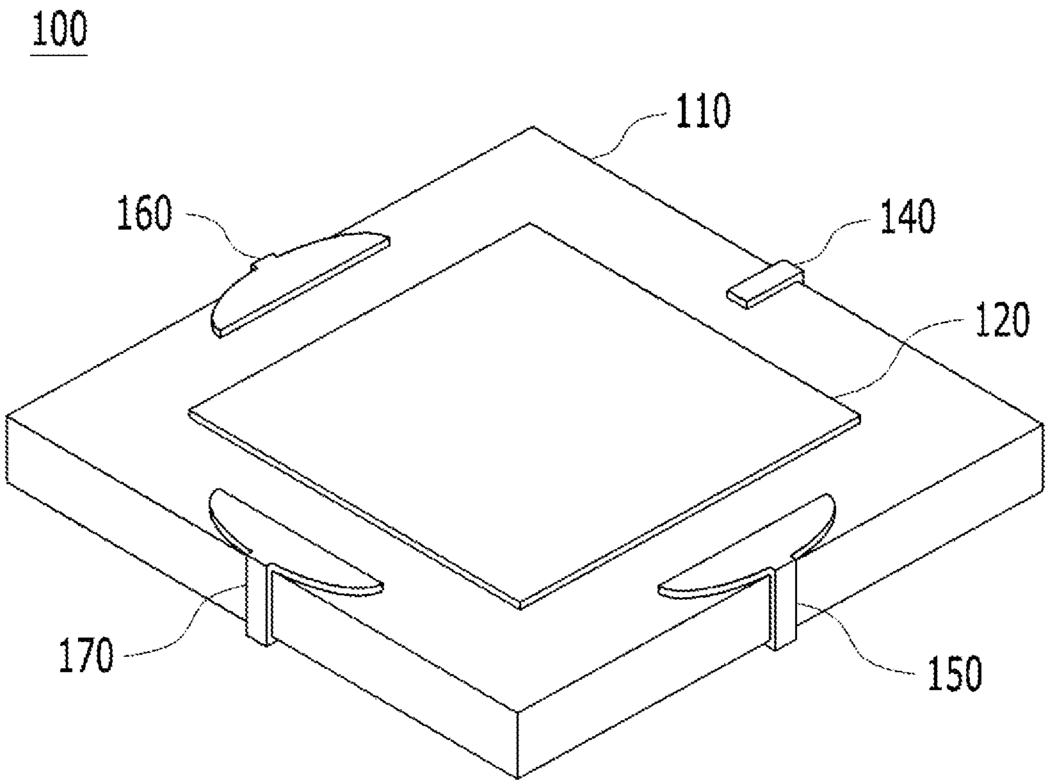

[FIG. 9]
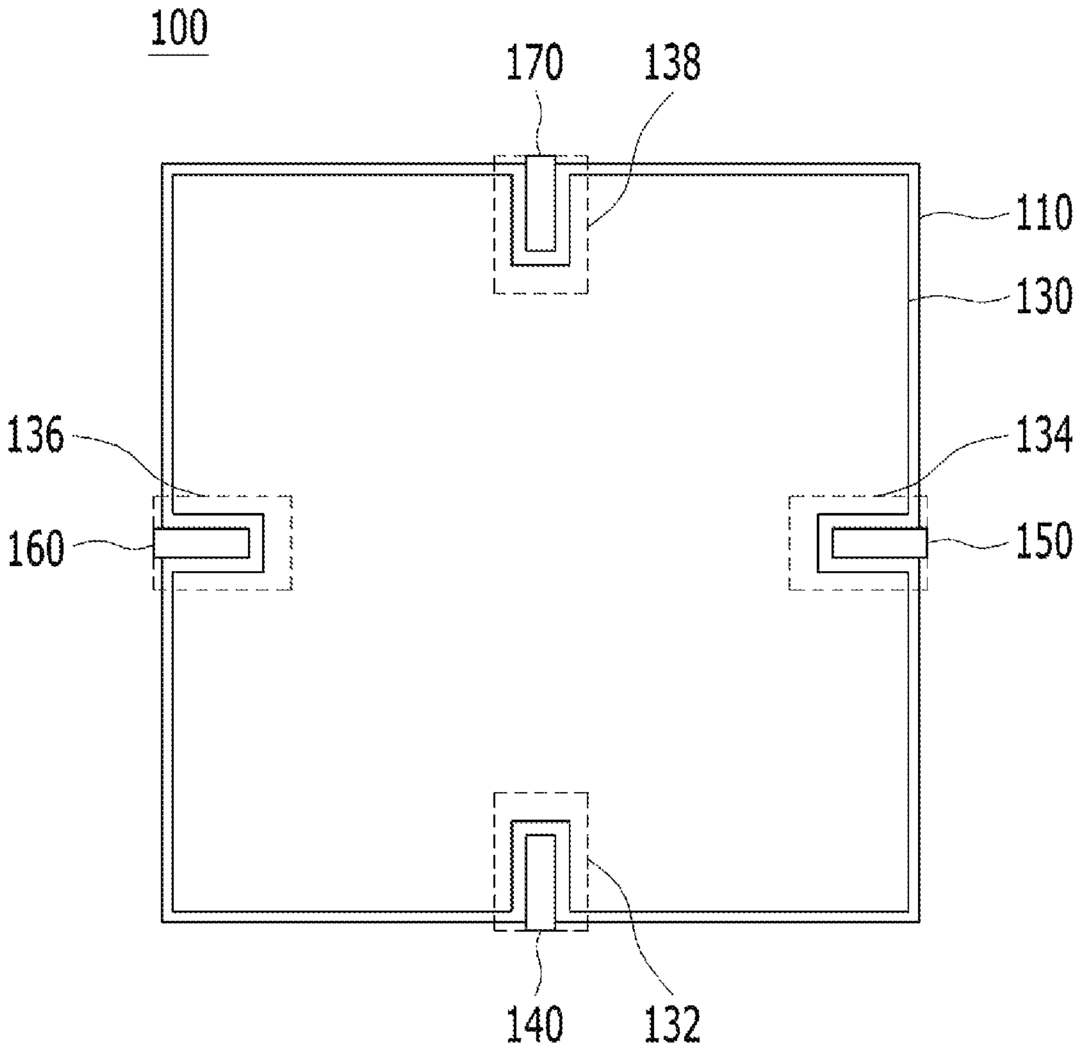

[FIG. 10]
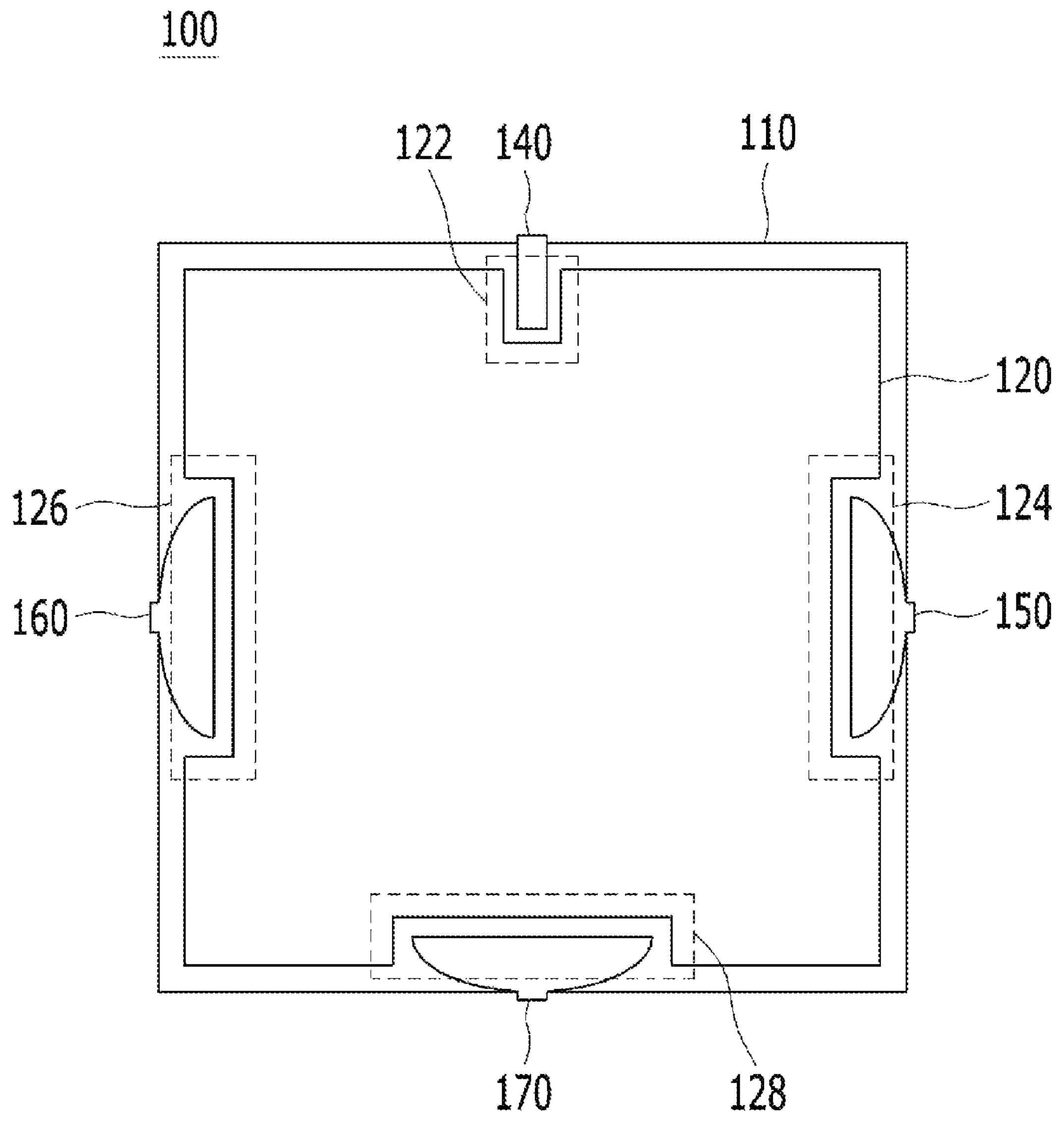

MULTI-BAND PATCH ANTENNA

TECHNICAL FIELD

The present disclosure relates to a multi-band patch antenna and, more particularly, to a multi-band patch antenna that resonates to a frequency in a bandwidth of at least one of GPS, GLONASS, and SDARS and to a frequency in a bandwidth of Ultra-Wideband (UWB).

BACKGROUND ART

Usually, a patch antenna is used as an antenna that resonates to a frequency in a bandwidth of GNSS (for example, GPS (USA) or GLONASS (Russia)), SDARS (SiriusXM) or the like.

In recent years, with the advances in autonomous vehicular traveling, there has been a demand for higher-precision positional information. Accordingly, there has been a demand for an antenna that resonates to a frequency in a bandwidth at which high-precision positional information can be transmitted as in UWB, BLE, WiFi, and the like.

SUMMARY OF INVENTION

Technical Problem

An object of the present disclosure, which is made in view of the above-mentioned situation, is to provide a multi-band patch antenna in which a feeding patch and one or more radiation patches are formed on a base substrate in such a manner as to be spaced apart from an upper patch and which resonates to a frequency in a second bandwidth, as well as to a frequency in a first bandwidth that is a frequency bandwidth of GNSS.

Solution to Problem

In order to accomplish the above-mentioned object, according to an aspect of the present disclosure, there is provided a multi-band patch antenna including: a base substrate having an upper surface, a lower surface, and a plurality of lateral surfaces; an upper patch arranged on the upper surface of the base substrate; a lower patch arranged on the lower surface of the base substrate; a feeding patch arranged in a manner that comes into contact with the upper surface of the base substrate and a first lateral surface thereof and is spaced apart from the upper patch on the upper surface of the base substrate; and a first radiation patch arranged in a manner that comes into contact with the upper surface of the base substrate and a second lateral surface thereof and is spaced apart from the upper patch and the feeding patch on the upper surface of the base substrate.

In the multi-band patch antenna, the upper surface of the base substrate may be divided into a first region on which the upper patch is arranged and a second region on which the upper patch is not arranged, and a first end portion of the feeding patch and a first end portion of the first radiation patch may be formed on the second region of the base substrate in a manner that is spaced apart from the upper patch.

In the multi-band patch antenna, a second end portion of the feeding patch and a second end portion of the first radiation patch may be arranged on the lower surface of the base substrate, a first accommodation in which a second end portion of the feeding patch is accommodated and a second accommodation groove in which a second end portion of the first radiation patch is accommodated may be defined on the lower patch, and the feeding patch and the first radiation patch may be arranged in such a manner as to be spaced apart from the lower patch.

The multi-band patch antenna may further include a second radiation patch arranged in a manner that comes into contact with the upper surface of the base substrate and a third lateral surface thereof and is spaced apart from the upper patch and the feeding patch on the upper surface of the base substrate. In the multi-band patch antenna, the second radiation patch may be formed in such a manner that a first end portion thereof is arranged on the second region of the base substrate and is spaced apart from the upper patch and that a second end portion thereof is arranged on the lower surface of the base substrate, and a third accommodation groove in which the second end portion of the second radiation patch is accommodated may be defined on the lower patch.

The multi-band patch antenna may further include a third radiation patch arranged in a manner that comes into contact with the upper surface of the base substrate and a fourth lateral surface thereof and is spaced apart from the upper patch and the feeding patch on the upper surface of the base substrate. In the multi-band patch antenna, the third radiation patch may be formed in such a manner that a first end portion thereof is arranged on the second region of the base substrate and is spaced apart from the upper patch and that a second end portion thereof is arranged on the lower surface of the base substrate and a fourth accommodation groove in which the second end portion of the third radiation patch is accommodated may be defined on the lower patch.

In the multi-band patch antenna, a fifth accommodation groove in which the first end portion of the feeding patch is accommodated and a sixth accommodation groove in which the first end portion of the first radiation patch is accommodated may be defined on the upper patch.

Advantageous Effects of Invention

In a multi-band patch antenna according to the present disclosure, an additional radiation pattern is integrated into the existing patch antenna structure. As a result, the multi-band patch antenna can function as an outdoor positioning antenna that receives signals from a satellite outdoors. A composite antenna, capable of indoors and outdoors performing both indoor and outdoor positioning, can be implemented with a simple structure, using a UWB antenna.

In addition, unlike in a patch antenna in the related art where an additional patch needs to be formed or patches need to be stacked on top of each other, the simple addition of the radiation pattern in the multi-band patch antenna can create a patch antenna that resonates to frequencies in two different bandwidths, while minimizing any increase in size.

BRIEF DESCRIPTION OF DRAWINGS

FIG. 1 is a perspective view illustrating a multi-band patch antenna according to a first embodiment of the present disclosure.

FIG. 2 is a front view illustrating the multi-band patch antenna according to the first embodiment of the present disclosure.

FIG. 3 is a bottom view illustrating the multi-band patch antenna according to the first embodiment of the present disclosure.

FIG. 4 is a view that is referred to for description of regional division of a base substrate in FIG. 1.

FIG. 5 is a perspective view illustrating a multi-band patch antenna according to a second embodiment of the present disclosure.

FIG. 6 is a bottom view illustrating the multi-band patch antenna according to the second embodiment of the present disclosure.

FIG. 7 is a top view illustrating the multi-band patch antenna according to the second embodiment of the present disclosure.

FIG. 8 is a perspective view illustrating a multi-band patch antenna according to a third embodiment of the present disclosure.

FIG. 9 is a bottom view illustrating the multi-band patch antenna according to the third embodiment of the present disclosure.

FIG. 10 is a view that is referred to for description of a modification example of the multi-band patch antenna to the embodiment of the present disclosure.

DESCRIPTION OF EMBODIMENTS

Preferred embodiments of the present disclosure will be in detail described with reference to the accompanying drawings in such a manner as to enable an ordinary person of ordinary skill in the art to which the present disclosure pertains to practice the present disclosure without undue experimentation. It should be noted that the same constituent elements, although illustrated in different drawings, are designated by the same reference numeral when a reference numeral is assigned to a constituent element in the drawings. In addition, a specific description of a well-known configuration or function that is associated with the present disclosure will be omitted when determined as making the nature and gist of the present disclosure obfuscated.

With reference to FIGS. 1 to 3, a multi-band patch antenna 100 according to a first embodiment of the present disclosure is configured to include a base substrate 110, an upper patch 120, a lower patch 130, a feeding pattern 140, and a first radiation pattern 150.

The base substrate 110 is configured as a dielectric component having an upper surface, a lower surface, and a plurality of lateral surfaces. As an example, the base substrate 110 is configured as a dielectric substrate formed of a ceramic material that is characterized by a high permittivity, a low thermal expansion coefficient, and the like.

The base substrate 110 may be configured as a magnetic body having an upper surface, a lower surface, and a plurality of lateral surfaces. As an example, the base substrate 110 is configured as a magnetic substrate formed from a ferrite magnet or the like.

With reference to FIG. 4, as an example, the base substrate 110 includes a first lateral surface, a second lateral surface facing the first lateral surface, a third lateral surface connected to a first end portion of the first lateral surface and a first end portion of the second lateral surface, and a fourth surface connected to a second end portion of the first lateral surface and a second end portion of the second lateral surface in a manner that faces the third lateral surface. Furthermore, an upper surface of the base substrate 110 is divided into a first region S1 in which the upper patch 120 is arranged, and a second region S2 in which the upper patch 120 is not arranged.

The upper patch 120 is arranged on an upper surface of the base substrate 110. The upper patch 120 is arranged on the upper surface of the base substrate 110, but on the first region S1 of the base substrate 110.

The upper patch 120 is made from a thin plate formed of a conductive material, such as copper, aluminum, gold, or silver, that has a high electric conductivity. The upper patch 120 may be formed to have a horizontal cross section with various shapes, such as a rectangle, a triangle, and an octagon, according to a shape of the base substrate 110.

The upper patch 120 may be changed to various shapes through a process, such as frequency tuning. In this point, the upper patch 120 is fed through the feeding pattern 140 and thus operates as an antenna that resonates to a frequency in a bandwidth of one of GNSS (for example, GPS (USA) or GLONASS (Russia)) and SDARS (for example, SiriusXM).

The lower patch 130 is arranged on a lower surface of the base substrate 110. The lower patch 130 is made from a thin plate formed of a conductive material, such as copper, aluminum, gold, or silver, that has a high electric conductivity. The lower patch 130 may be formed to have a horizontal cross section with various shapes, such as a rectangle, a triangle, and an octagon, according to the shape of the base substrate 110. In this case, as an example, the lower patch 130 is a patch for grounding (GND).

A first accommodation groove 132 in which a second end portion of the feeding pattern 140 is accommodated and second accommodation groove 134 in which a second end portion of the first radiation pattern 150 is accommodated may be formed in the lower patch 130.

The first accommodation groove 132 and the second accommodation groove 134 are firmed by cutting off one portion of the lower patch 130 in a manner that extends from an edge of the lower patch 130 toward the direction of the center point of the lower patch 130.

The first accommodation groove 132 may be formed to have a horizontal cross section with various shapes, such as a circle, a rectangle, a triangle, and a pentagon. The first accommodation groove 132 may have any shape that allows for accommodation of one portion (one portion, to the side of the second end portion, of the feeding pattern 140) of the feeding pattern 140.

The second accommodation groove 134 may be formed to have a horizontal cross section with various shapes, such as a circle, a rectangle, a triangle, and a pentagon. The second accommodation groove 134 may have any shape that allows for accommodation of one portion (one portion, to the side of the second end portion, of the first radiation pattern 150) of the first radiation pattern 150.

The feeding pattern 140 feeds the upper patch 120 in order to operate the upper patch 120 as a first antenna. The feeding pattern 140 is arranged in a manner that comes into contact with the upper surface, the lateral surface, and the lower surface of the base substrate 110. In this case, the feeding pattern 140 is arranged on one of the first to fourth lateral surfaces of the base substrate 110.

The feeding pattern 140 is formed in such a manner that a first end portion thereof is arranged on the upper surface of the base substrate 110, but on the second region S2 of the base substrate 110 in a manner that is spaced a predetermined distance apart from the upper patch 120. The first end portion of the feeding pattern 140 is arranged on the upper surface of the base substrate 110 in a manner that is spaced a predetermined distance apart from the upper patch 120 and thus forms a coupling feeding structure along with the upper patch 120.

The feeding pattern 140 is arranged in a manner that comes into contact with the upper surface and the lateral surface of the base substrate 110. The feeding pattern 140 extends from the upper surface of the base substrate 110 to the lateral surface thereof. Thus, the second end portion of the feeding pattern 140 is arranged on one lateral surface of the base substrate 110.

The feeding pattern 140 may extend from the upper surface of the base substrate 110 through the lateral surface thereof up to the lower surface thereof in a manner that comes into contact with the upper, lateral, and lower surfaces of the base substrate 110. Thus, the second end portion of the feeding pattern 140 may be arranged on the lower surface of the base substrate 110. In this case, the feeding pattern 140 is arranged in such a manner that the second end portion thereof is accommodated in the first accommodation groove 132 in the lower patch 130 and is spaced a predetermined distance apart from the lower patch 130.

The first radiation pattern 150 operates as a second antenna that resonates to a frequency in a different bandwidth than the upper patch 120. In this case, as an example, the second antenna is an antenna that resonates to a signal in a UWB frequency bandwidth.

The first radiation pattern 150, made from a thin metal plate, is arranged on the second region S2 of the base substrate 110. As an example, the first radiation pattern 150 is made from a thin metal plate formed of a conductive material, such as copper, aluminum, gold, or silver, that has a high electric conductivity.

The first radiation pattern 150 is formed in such a manner that a first end portion thereof is arranged on the upper surface of the base substrate 110, but on the second region S2 of the base substrate 110 in a manner that is spaced a predetermined distance apart from the upper patch 120. In this case, the first end portion of the first radiation pattern 150 may be formed in the shape of a plate that has a horizontal cross section with various shapes, such as a circle, a semicircle, an ellipse, and a semi-ellipse.

The first radiation pattern 150 is arranged in a manner that comes into contact with the upper surface and the lateral surface of the base substrate 110. The first radiation pattern 150 extends from the upper surface of the base substrate 110 to the lateral surface thereof. Thus, the second end portion of the first radiation pattern 150 is arranged on one lateral surface of the base substrate 110.

The first radiation pattern 150 may extend from the upper surface of the base substrate 110 through the lateral surface thereof up to the lower surface thereof in a manner that comes into contact with the upper, lateral, and lower surfaces of the base substrate 110. Thus, the second end portion of first radiation pattern 150 may be arranged on the lower surface of the base substrate 110. In this case, the first radiation pattern 150 is arranged in such a manner that the second end portion thereof is accommodated in the second accommodation groove 134 in the lower patch 130 and is spaced a predetermined distance apart from the lower patch 130.

The first radiation pattern 150 is arranged on the base substrate 110, but in a manner that comes into contact with the lateral surface of the base substrate 110 on which the feeding pattern 140 is not formed. As an example, in a case where the feeding pattern 140 is arranged in a manner that comes into contact with the first lateral surface of the base substrate 110, the first radiation pattern 150 is arranged in a manner that comes into contact with one of the second to fourth lateral surfaces of the base substrate 110.

Withe reference to FIGS. 5 and 6, a multi-band patch antenna 100 according to a second embodiment of the present disclosure may be configured to include a second radiation pattern 160 in addition to the constituent elements of the multi-band patch antenna 100 according to the first embodiment of the present disclosure.

The second radiation pattern 160 operates as the second antennas, together with the first radiation pattern 150. The second radiation pattern 160, made from a thin metal plate, is formed on the second region S2 of the base substrate 110. As an example, the second radiation pattern 160 is made from a thin metal plate formed of a conductive material, such as copper, aluminum, gold, or silver, that has a high electric conductivity.

The second radiation pattern 160 is formed in such a manner that a first end portion thereof is arranged on the upper surface of the base substrate 110, but on the second region S2 of the base substrate 110 in a manner that is spaced a predetermined distance apart from the upper patch 120. In this case, the first end portion of the second radiation pattern 160 may be formed in the shape of a plate that has a horizontal cross section with various shapes, such as a circle, a semicircle, an ellipse, and a semi-ellipse.

The second radiation pattern 160 is arranged in a manner that comes into contact with the upper surface and the lateral surface of the base substrate 110. The second radiation pattern 160 extends from the upper surface of the base substrate 110 to the lateral surface thereof. Thus, a second end portion of the second radiation pattern 160 is arranged on one lateral surface of the base substrate 110.

The second radiation pattern 160 extends from the upper surface of the base substrate 110 through the lateral surface thereof up to the lower surface thereof in a manner that comes into contact with the upper, lateral, and lower surfaces of the base substrate 110. Thus, the second end portion of the second radiation pattern 160 may be arranged on the lower surface of the base substrate 110. In this case, a third accommodation groove 136 is further formed in the lower patch 130. Furthermore, the second end portion of the second radiation pattern 160 is arranged in a manner that is accommodated in the third accommodation groove 136 in the lower patch 130 and is spaced a predetermined distance apart from the lower patch 130.

In this case, the second radiation pattern 160 is arranged on the base substrate 110, but in a manner that comes into contact with one lateral surface of the base substrate 110 on which the feeding pattern 140 and the first radiation pattern 150 are not formed. As an example, the feeding pattern 140 is arranged in a manner that comes into contact with the first lateral surface of the base substrate 110, and the first radiation pattern 150 is arranged in a manner that comes into contact with one of the second to fourth lateral surfaces of the base substrate 110. In this case, the second radiation pattern 160 is arranged in a manner that comes into contact with one, on which the first radiation pattern 150 is not formed, of the second to fourth lateral surfaces.

With reference to FIG. 7, the second radiation pattern 160 is arranged in a manner that faces the first radiation pattern 150 with the center point C of the base substrate 110 in between. As an example, when the first radiation pattern 150 is arranged in a manner that contacts into contact with the third lateral surface of the base substrate 110, the second radiation pattern 160 is arranged in a manner that comes into contact with the fourth lateral surface of the base substrate 110 and thus faces the first radiation pattern 150.

With reference to FIGS. 8 and 9, a multi-band patch antenna 100 according to a third embodiment of the present disclosure may be configured to include a third radiation pattern 170 in addition to the constituent elements of the multi-band patch antenna 100 according to the first embodiment of the present disclosure.

The third radiation pattern 170 operates as the second antenna, together with the first radiation pattern 150. The third radiation pattern 170, made from a thin metal plate, is formed on the second region S2 of the base substrate 110. As an example, the third radiation pattern 170 is made from a thin metal plate formed of a conductive material, such as copper, aluminum, gold, or silver, that has a high electric conductivity.

The third radiation pattern 170 is formed in such a manner that a first end portion thereof is arranged on the upper surface of the base substrate 110, but on the second region S2 of the base substrate 110 in a manner that is spaced a predetermined distance apart from the upper patch 120. In this case, the first end portion of the third radiation pattern 170 may be formed in the shape of a plate that has a horizontal cross section with various shapes, such as a circle, a semicircle, an ellipse, and a semi-ellipse.

The third radiation pattern 170 is arranged in a manner that comes into contact with the upper surface and the lateral surface of the base substrate 110. The second radiation pattern 160 extends from the upper surface of the base substrate 110 toward the lateral surface thereof. Thus, a second end portion of the third radiation pattern 170 is arranged on one lateral surface of the base substrate 110.

The third radiation pattern 170 extends from the upper surface of the base substrate 110 through the lateral surface thereof up to the lower surface thereof in a manner that comes into contact with the upper, lateral, and lower surfaces of the base substrate 110. Thus, the second end portion of the third radiation pattern 170 may be arranged on the lower surface of the base substrate 110. In this case, a fourth accommodation groove 138 is further formed in the lower patch 130. The second end portion of the third radiation pattern 170 is arranged in a manner that is accommodated in a fourth accommodation groove 138 in the lower patch 130 and is spaced a predetermined distance apart from the lower patch 130.

The third radiation pattern 170 is formed on one lateral surface, on which the feeding pattern 140, the first radiation pattern 150, and the second radiation pattern 160 are not formed, of the base substrate 110. As an example, the feeding pattern 140 is arranged in a manner that comes into contact with the first lateral surface of the base substrate 110, and the first radiation pattern 150 and the second radiation pattern 160 are arranged in such a manner as to come into contact with the third and fourth lateral surfaces, respectively, of the base substrate 110. In this case, the third radiation pattern 170 is arranged to extend from the second lateral surface of the base substrate 110 up to the fourth lateral surface thereof in a manner that comes into contact with the second lateral surface of the base substrate 110 to the fourth lateral surfaces thereof on which the 1+first radiation pattern 150 is not formed.

Reduction in size of the multi-band patch antenna 100 results in reduction in size of the second region S2 of the base substrate 110. For this reason, the feeding pattern 140 and the radiation pattern (that is, at least one of the first radiation pattern 150, the second radiation pattern 160, and the third radiation pattern 170) are electrically connected to the upper patch 120, or interference occurs between the feeding pattern 140 and the radiation pattern. Thus, antenna performance decreases, or the second antenna cannot be configured.

In order to address this problem, there is a need to maintain a separation distance between each of the feeding pattern 140 and the radiation pattern and the upper patch 120. To this end, with reference to FIG. 10, a fifth accommodation groove 122 in which the feeding pattern 140 is accommodated, a sixth accommodation groove 124 in which the first radiation pattern 150 is accommodated, a seventh accommodation groove 126 in which the second radiation pattern 160 is accommodated, and an eighth accommodation groove 128 in which the third radiation pattern 170 is accommodated may be formed in the upper patch 120.

Each of the fifth to eighth accommodation grooves 122 to 128 is formed by cutting off one portion of the upper patch 120, but in the direction from an edge of the upper patch 120 to the center of the upper patch 120. As an example, the fifth to eighth accommodation grooves 122 to 128 may be formed to have a horizontal cross section with various shapes, such as a circle, a rectangle, a triangle, and a pentagon. The fifth to eighth accommodation grooves 122 to 128 may have any shape that allows for accommodation of one portion of the feeding pattern 140 and the radiation pattern.

FIG. 10 illustrates that four accommodation grooves are formed in the upper patch 120. However, the upper patch 120 is not limited to the four accommodation grooves. One, two, or three accommodation grooves may be formed in the upper patch 120, depending on the number of the radiation patterns. That is, in a case where one radiation pattern is provided, two accommodation grooves (that is, the fifth accommodation groove 122 and the sixth accommodation groove 124) are formed in the upper patch 120. That is, in a case where two radiation patterns are provided, three accommodation grooves (that is, the fifth accommodation groove 122, the sixth accommodation groove 124, and the seventh accommodation groove 126) are formed in the upper patch 120. That is, in a case where three radiation patterns are provided, four accommodation grooves (that is, the fifth accommodation groove 122, the sixth accommodation groove 124, the seventh accommodation groove 126, and the eighth accommodation groove 128) are formed in the upper patch 120.

The preferred embodiments of the present disclosure are described above. However, the present disclosure may be practiced in various forms. It would be apparent to a person of ordinary skill in the art that various modifications and alterations may be made to the preferred embodiments without departing from the scope of the claims of the present disclosure.

The invention claimed is:

1. A multi-band patch antenna comprising:

a base substrate having an upper surface, a lower surface, and a plurality of lateral surfaces;

an upper patch arranged on the upper surface of the base substrate;

a lower patch arranged on the lower surface of the base substrate;

a feeding patch arranged on the upper surface of the base substrate and a first lateral surface thereof, and spaced apart from the upper patch on the upper surface of the base substrate; and a first radiation patch arranged on the upper surface of the base substrate and a second lateral surface thereof, and spaced apart from the upper patch and the feeding patch on the upper surface of the base substrate, and wherein an accommodation groove is formed in the upper patch to accommodate a portion of the feeding patch arranged on the upper surface of the base substrate, and another accommodation groove is formed in the upper patch to accommodate a portion of the first radiation patch arranged on the upper surface of the base substrate.

2. The multi-band patch antenna of claim 1, wherein the upper surface of the base substrate is divided into a first region on which the upper patch is arranged and a second region on which the upper patch is not arranged.

3. The multi-band patch antenna of claim 2, wherein the feeding patch and the first radiation patch are formed so that a first end portion of the feeding patch and a first end portion of the first radiation patch are arranged on the second region of the base substrate to be spaced apart from the upper patch.

4. The multi-band patch antenna of claim 2, wherein a second end portion of the feeding patch and a second end portion of the first radiation patch are arranged on the lower surface of the base substrate.

5. The multi-band patch antenna of claim 4, wherein a first accommodation groove in which the second end portion of the feeding patch is accommodated and a second accommodation groove in which the second end portion of the first radiation patch is accommodated are defined on the lower patch, and wherein the feeding patch and the first radiation patch are arranged in such a manner as to be spaced apart from the lower patch.

6. The multi-band patch antenna of claim 4, further comprising:

a second radiation patch arranged on the upper surface of the base substrate and a third lateral surface thereof, and spaced apart from the upper patch and the feeding patch on the upper surface of the base substrate.

7. The multi-band patch antenna of claim 6, wherein the second radiation patch is formed so that a first end portion thereof is spaced apart from the upper patch on a second region of the base substrate and that a second end portion of thereof is arranged on the lower surface of the base substrate, and wherein a third accommodation groove in which the second end portion of the second radiation patch is accommodated is defined on the lower patch.

8. The multi-band patch antenna of claim 6, further comprising:

a third radiation patch arranged on the upper surface of the base substrate and a fourth lateral surface thereof and spaced apart from the upper patch and the feeding patch on the upper surface of the base substrate.

9. The multi-band patch antenna of claim 8, wherein the third radiation patch is formed so that a first end portion thereof is arranged on a second region of the base substrate and is spaced apart from the upper patch and that a second end portion thereof is arranged on the lower surface of the base substrate, and wherein a fourth accommodation groove in which the second end portion of the third radiation patch is accommodated is defined on the lower patch.

10. The multi-band patch antenna of claim 1, wherein a fifth accommodation groove in which a first end portion of the feeding patch is accommodated and a sixth accommodation groove in which a first end portion of the first radiation patch is accommodated are defined on the upper patch.

* * * * *